Nov. 5, 1935.  B. A. SWENNES  2,019,745

TRANSMISSION MECHANISM

Filed March 24, 1934

Inventor:
Benjamin A. Swennes
By Axel A. Hofgren
his Atty.

Patented Nov. 5, 1935

2,019,745

UNITED STATES PATENT OFFICE 2,019,745

TRANSMISSION MECHANISM

Benjamin Arthur Swennes, Rockford, Ill., assignor to Borg-Warner Corporation, Chicago, Ill., a corporation of Illinois Application March 24, 1934, Serial No. 717,217

11 Claims. (Cl. 192—48)

More particularly the invention relates to a transmission mechanism of the type in which a hydraulic power transmitter or coupling of the fluid flywheel type is connected in series with a mechanically operable clutch. Related inventions of the applicant are shown in co-pending applications entitled "Transmission mechanism", one of such applications being serially numbered 706,993, filed January 17, 1934, and the other being serially numbered 717,216, filed March 24, 1934.

It is the general object of the invention to provide a new and improved transmission mechanism embodying such a hydraulic power transmitter and a mechanical clutch.

Another object is to provide in a transmission mechanism of the character described an overrunning clutch or free-wheeling device, together with means for locking out the free-wheeling device if desired.

Yet another object is to provide, in combination with a fluid coupling associated with an engine flywheel, an overrunning clutch or freewheeling device positioned immediately adjacent the flywheel.

A further object of the invention is to provide a unitary composite mechanical friction clutch and fluid coupling device connected in series relation and an overrunning clutch incorporated in the fluid coupling device.

Other objects will become readily apparent from the following detailed description taken in connection with the accompanying drawing, in which.

Figure 1:
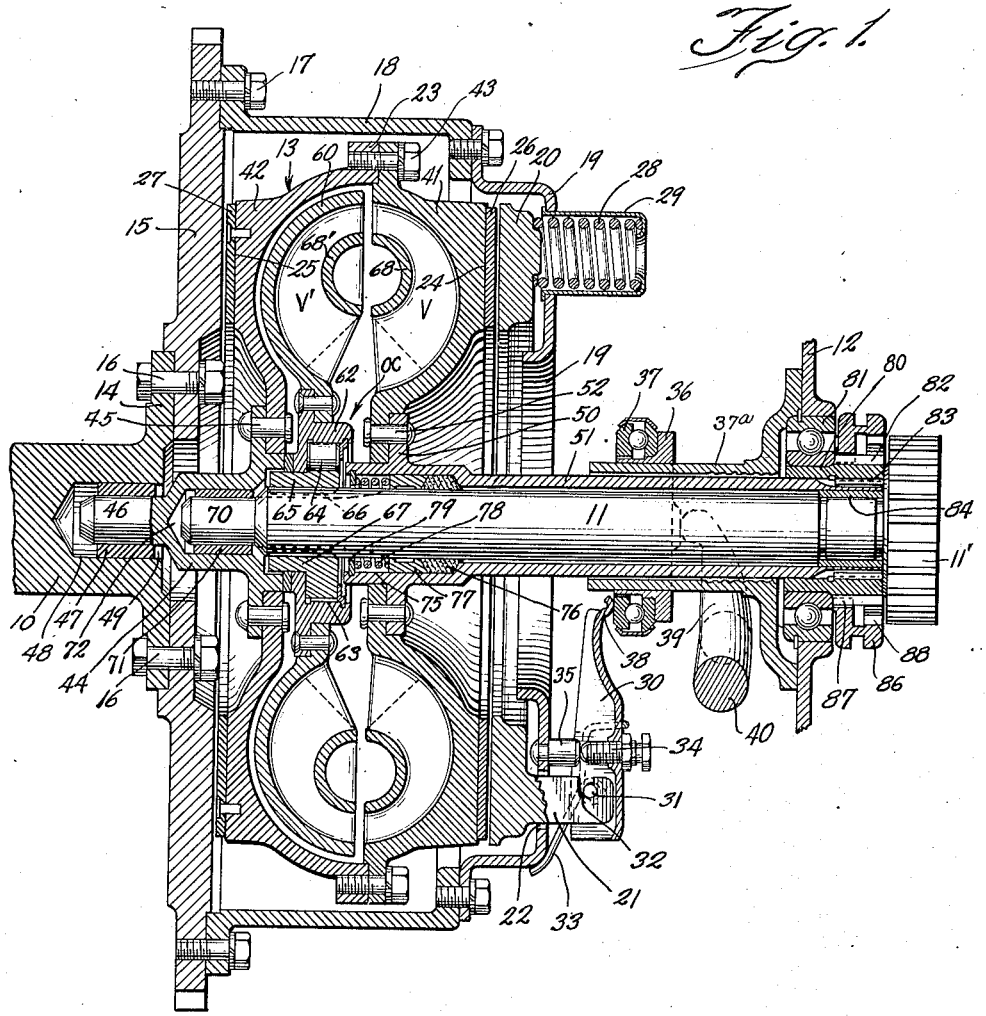
Fig. 1 is a longitudinal central section through a preferred form of the invention.
Figure 2:
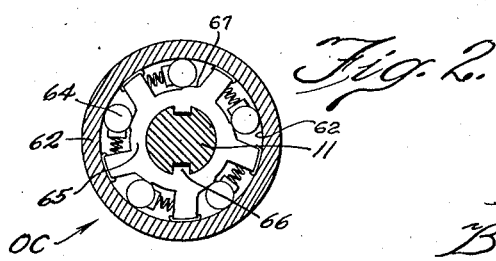
Fig. 2 is a face elevational view of the overrunning clutch.

While the invention is susceptible of embodiment in many different forms, I have shown in the drawing and will herein describe in detail one such embodiment with the understanding that the present disclosure is to be considered as an exemplification of the principles of the invention, and is not intended to limit the invention to the embodiment illustrated. The scope of the invention will be pointed out in the appended claims.

In the exemplary embodiment of the invention a drive shaft 10 is axially alined with a driven shaft 11 carrying a gear 11' at one end and positioned with that end extending into a conventional gear box or casing a portion of which is shown at 12. Interposed between the drive shaft 10 and the driven shaft 11 are a mechanical friction clutch and a fluid coupling, generally designated 13, normally connected in series relationship to transmit power from the driving to the driven shaft. A free wheeling device OC is incorporated in the fluid coupling but may be locked out if desired by means provided for that purpose.

The drive shaft 10 may be one end of an engine crankshaft having a flange 14 to which a flywheel 15 is secured by a plurality of bolts 16. Secured to the flywheel, as by bolts 17, is an annular ring member 18 which in turn has bolted thereto a back plate 19. An annular pressure plate 20 is supported by the back plate in opposed relation to the flywheel 15 and forms therewith the driving element of the mechanical friction clutch. The pressure plate 20 is caused to rotate with the back plate 19 and with the flywheel 15 by a plurality of bosses 21 projecting from the pressure plate through apertures 22 in the back plate 19.

The fluid coupling is herein shown in the form of a fluid flywheel with a driving element in the form of an annular casing 23 having opposed annular and parallel surfaces 24 and 25 on its opposite ends. To these surfaces rings of clutch material 26 and 27 are suitably riveted and the casing interposed between the flywheel 15 and the pressure plate 20 to form the driven element of the mechanical clutch.

The pressure plate 20 is normally urged toward the left as shown in Fig. 1, so as to engage the clutch surfaces. For that purpose, a plurality of springs 28 are positioned in cup-shaped housings 29 carried by the plate 19, one end of each spring engaging the pressure plate so as to urge the pressure plate toward the flywheel 15. The means for releasing the clutch comprises a plurality of angularly spaced throwout fingers 30 which are carried on and rotate with the flywheel structure. These fingers have pins 31 pivotally mounted in recesses 32 in the pressure plate bosses 21, and are maintained on the bosses by means of torsion springs 33 coiled on the pins 31 and having the ends thereof engaging the fingers and the housing respectively. The springs tend to shift the fingers in a counterclockwise direction about their fulcrums thus preventing rattling as well as taking up clearance at the loose connection where the pins engage the bosses. The throwout fingers carry adjustable screw devices 34, the ends of which engage buttons 35 on the plate 19 so as to form fulcrums for the fingers.

The free ends of the fingers 30 extend radially inward toward the shaft 11 and are arranged to be operated by means of a throwout bearing 36, a ball bearing 37 being inserted intermediate the bearing and the inner ends 38 of the fingers since the throwout bearing is non-rotatably mounted on a tubular supporting sleeve 37ᵃ mounted on the adjacent wall of the gear casing 12. The bearing 36 may be actuated by suitable means such as a fork 39 mounted on a shaft 40. When the invention is used in connection with an automotive vehicle the shaft 40 would preferably be arranged for operation by means of the usual clutch pedal.

The driving element 23 of the hydraulic power transmitter is herein illustrated as having a right hand section 41 and a left hand section 42 joined at the periphery by bolts 43. A flanged hub 44 is secured to section 42 by means of a plurality of rivets 45, the hub having a trunnion portion 46 rotatably mounted in a sleeve bearing 47 positioned in a recess 48 in the drive shaft 10. A clearance 49 is provided in bearing 47 to permit a limited longitudinal sliding movement of casing 23. Section 41 of casing 23 is similarly secured to a flange 50 on a tubular member 51 by means of a plurality of rivets 52. The tubular member 51 surrounds the shaft 11 and preferably extends into the gear casing 12 for a purpose hereinafter more fully pointed out.

The driven element or runner 60 of the fluid flywheel is rotatably mounted within the casing 23 and formed as hereinafter described so as to be driven by the movement of the fluid in the casing during operation of the device. In the preferred form of the invention the runner is connected to the shaft 11 by means of the overrunning clutch or free-wheeling device OC incorporated as a part of the fluid coupling. The runner has a hub portion 62 provided with a recess 63 against the peripheral wall of which a plurality of rollers 64 are arranged to operate. A sleeve 65 secured to the shaft 11 by a plurality of keys 66 has cam portions 67 which cooperate with the rollers 64 in a well known manner so that the shaft 11 is driven by the runner through the overrunning clutch.

The driving element 23 of the fluid flywheel is provided with angularly spaced radially extending impeller vanes V on section 41 which are somewhat semi-circular in form and project from the inner wall of the casing. The vanes are intersected by a semi-cylindrical wall 68 which, with the vanes, forms fluid ducts. The ducts decrease in cross sectional area toward the outer portion of the casing because of the position of the wall 68 being offset toward the outer circumference. On the runner 60 which conforms somewhat to the shape of the adjacent section 42 of the casing 23, are vanes V' similar to those on the driving element. The vanes may be intersected by a corresponding semi-cylindrical wall 68' forming a similar system of ducts. If preferred the vanes V and V' may have segments cut from alternate vanes at the inner ends as illustrated by the dotted lines on the drawing.

The annular casing 23 is filled with a suitable fluid such as oil, and has an opening and plug, not shown, provided for replenishment of the supply when needed. During the operation of the coupling, fluid is forced outward by centrifugal force through the ducts formed on the driving element and into the ducts formed on the driven or runner element and, according to a well known principle, as the speed of the driving element increases the torque transmitted to the runner increases until a speed is attained where the runner is rotated by the driving element with a relatively small amount of slip as compared to the slip at low speeds. The effect is that of a direct cushioned drive between the annular casing 23 rotating with the friction clutch and the runner 60.

In order to prevent the fluid from leaking out and reaching the contact surfaces of the clutch the left-hand end of the shaft 11 is provided with a reduced portion forming a trunnion 70 which is rotatably mounted in a sleeve bearing 71 positioned in a recess 72 in the hub 44. With the hub tightly connected to the section 42, the left-hand end of the casing 23 is thus effectively closed. At the right-hand end of the casing, the tubular member 51 acts as a shield to prevent fluid from reaching the clutch contact surfaces. This member extends into the gear casing 12 so that any fluid leaking along the shaft 11 from any point would be conducted into the gear casing where it can do no harm. Preferably the tubular member 51 has an annular recess 75 adjacent its left-hand end in which recess suitable packing 76 is positioned. This packing is arranged to be taken up automatically by means of an annular pressure member 77 which is continually urged into contact with the packing by means of a coiled spring 78 positioned between the member 77 and a ring 79 carried on the left-hand end of the member 51.

It is believed apparent from the foregoing description that the transmission is normally automatic in operation and that the power transmitted from the drive shaft 10 to the gear 11' is transmitted through a cushioned drive connection including a free-wheeling device. Thus normally the power is transmitted through the fluid coupling and the free-wheeling device to the shaft 11. When so transmitted the mechanical friction clutch need not be manipulated but always remains engaged while the fluid coupling operates automatically because of its slip in effect to disengage the drive shaft from the driven shaft at idling speeds of the engine and to drive the driven shaft at speeds above idling speed.

Means is preferably provided for locking out the free-wheeling device and the fluid coupling so that if desired the transmission may be operated in the conventional manner by manual operation of the mechanical clutch. As illustrated herein, means is provided for locking the tubular member 51 to the shaft 11, thereby locking the casing 23 of the hydraulic fluid transmitter to the driven shaft 11. This locking means comprises a sleeve 80 which is rotatably mounted in a ball bearing 81 in the wall of the gear casing 12 and has teeth 82 formed thereon. The sleeve 80 surrounds the adjacent end of the tubular member 51 so as to form a support therefor and is secured thereto by a plurality of keys 83. The adjacent end of the shaft 11 is rotatably mounted within the tubular member 51 by means of a sleeve bearing 84 and carries the gear 11'. A slidably mounted clutch ring 86 is provided with one set of internal teeth 87 which mesh with the teeth 82, and is also provided with a set of internal clutch teeth 88 adapted to mesh with the gear 11'. It will be readily apparent that by moving the member 86 from the position shown in the drawing, toward the right, so as to engage the teeth 88 with the gear 11' the tubular member 51 and the shaft 11 will be effectively locked together. The drive of the gear 11' is thus a positive one controlled exclusively by the mechanical friction clutch.

I claim as my invention:

1. In a transmission mechanism, in combination, a mechanical friction clutch having driving and driven elements, a fluid flywheel comprising a casing and a runner rotatable in said casing, said casing constituting the driven element of said mechanical clutch, a shaft rotatably mounted in said casing and projecting from one end thereof, means connecting said runner to said shaft including an overrunning clutch, a tubular extension on said casing surrounding said shaft, a gear casing into which said shaft and said tubular extension project, a gear on said shaft, a clutch member splined to said tubular extension, and a clutch ring for connecting said clutch member and gear together to constrain said shaft to rotate with said tubular extension.

2. In a transmission mechanism, in combination, a mechanical friction clutch having driving and driven elements, a fluid flywheel comprising a casing and a runner rotatable in said casing and having a central annular recess, said casing constituting the driven element of said mechanical clutch, a shaft rotatably mounted in said casing and projecting from one end thereof, means connecting said runner to said shaft including an overrunning clutch comprising a cam member secured to said shaft within said casing and a plurality of rollers positioned within the annular recess in said runner and engaging said cam member, a tubular extension on said casing surrounding said shaft, and means operable to connect said extension to said shaft.

3. In a transmission mechanism, in combination, a mechanical friction clutch having driving and driven elements, a fluid flywheel comprising a casing and a runner rotatable in said casing, said casing constituting the driven element of said mechanical clutch, a shaft rotatably mounted in said casing and projecting from one end thereof, means connecting said runner to said shaft including an overrunning clutch, a tubular extension on said casing surrounding said shaft, and means operable to connect said extension to said shaft.

4. In a transmission mechanism in combination with a drive shaft and a driven shaft, a unitary composite clutch device comprising a mechanical friction clutch, a fluid coupling normally connected in series relationship with said mechanical friction clutch, and means including an overrunning clutch connecting said fluid coupling to the driven shaft, and means for connecting said mechanical friction clutch directly to said driven shaft to lock out the fluid coupling and the overrunning clutch.

5. In combination with a drive shaft and a driven shaft, transmission mechanism comprising a hydraulic power transmitter having a driving impeller member formed in a casing and a runner, means for rotatably mounting said impeller member, an overrunning clutch within said casing connecting said runner to said driven shaft, and means for locking said impeller member to said driven shaft to lock out the overrunning clutch.

6. In a transmission mechanism in combination with a drive shaft and a driven shaft, a mechanical friction clutch, a fluid flywheel normally connected in series relationship with said mechanical clutch, an overrunning clutch incorporated in said fluid flywheel and interposed between said fluid flywheel and the driven shaft, and means for locking out the fluid flywheel and connecting said mechanical friction clutch directly to said driven shaft.

7. In a transmission mechanism in combination with a drive shaft and a driven shaft, a mechanical friction clutch, a fluid flywheel normally connected in series relationship with said mechanical clutch, an overrunning clutch incorporated in said fluid flywheel and operatively interposed between said fluid flywheel and the driven shaft, and means operable to connect said mechanical friction clutch directly to the driven shaft.

8. In a transmission mechanism in combination with a drive shaft and a driven shaft, a unitary composite device comprising a mechanical friction clutch, a fluid coupling in series relation with said mechanical friction clutch having an operative connection with the driven shaft, an overrunning clutch incorporated in said operative connection, and means operable to connect said mechanical friction clutch directly to the driven shaft.

9. A transmission mechanism comprising a mechanical clutch having a driving element and a hollow driven element, a fluid clutch including said hollow element as the driving element thereof and a runner, coaxial driven members, means comprising an overrunning clutch for coupling said runner to one of said driven members, the other of said coaxial members being coupled with said hollow driven element, and locking means operable to effect a direct coupling between said coaxial members.

10. A transmission mechanism comprising a rotatable mechanical clutch, a fluid clutch including a rotatable runner adapted for propulsion by the driven element of the mechanical clutch, coaxial driven members, means comprising an overrunning clutch for coupling said runner with one of said coaxial members, the other of said coaxial members being coupled with the mechanical clutch for rotation therewith, and locking means manually operable to effect a coupling causing common rotation of said coaxial members.

11. A transmission mechanism comprising a rotatable mechanical clutch, a fluid clutch including a rotatable runner disposed for propulsion by the driven element of said mechanical clutch, concentric driven members, means comprising an overrunning clutch for coupling said runner with one of said concentric members, the other of said concentric members being coupled with the mechanical clutch for rotation therewith, and locking means manually operable to effect a coupling causing common rotation of said concentric members.

BENJAMIN ARTHUR SWENNES.